Feb. 11, 1969    R. F. CRUICKSHANK    3,426,898
SOIL SIFTER
Filed Oct. 10, 1966    Sheet 3 of 3

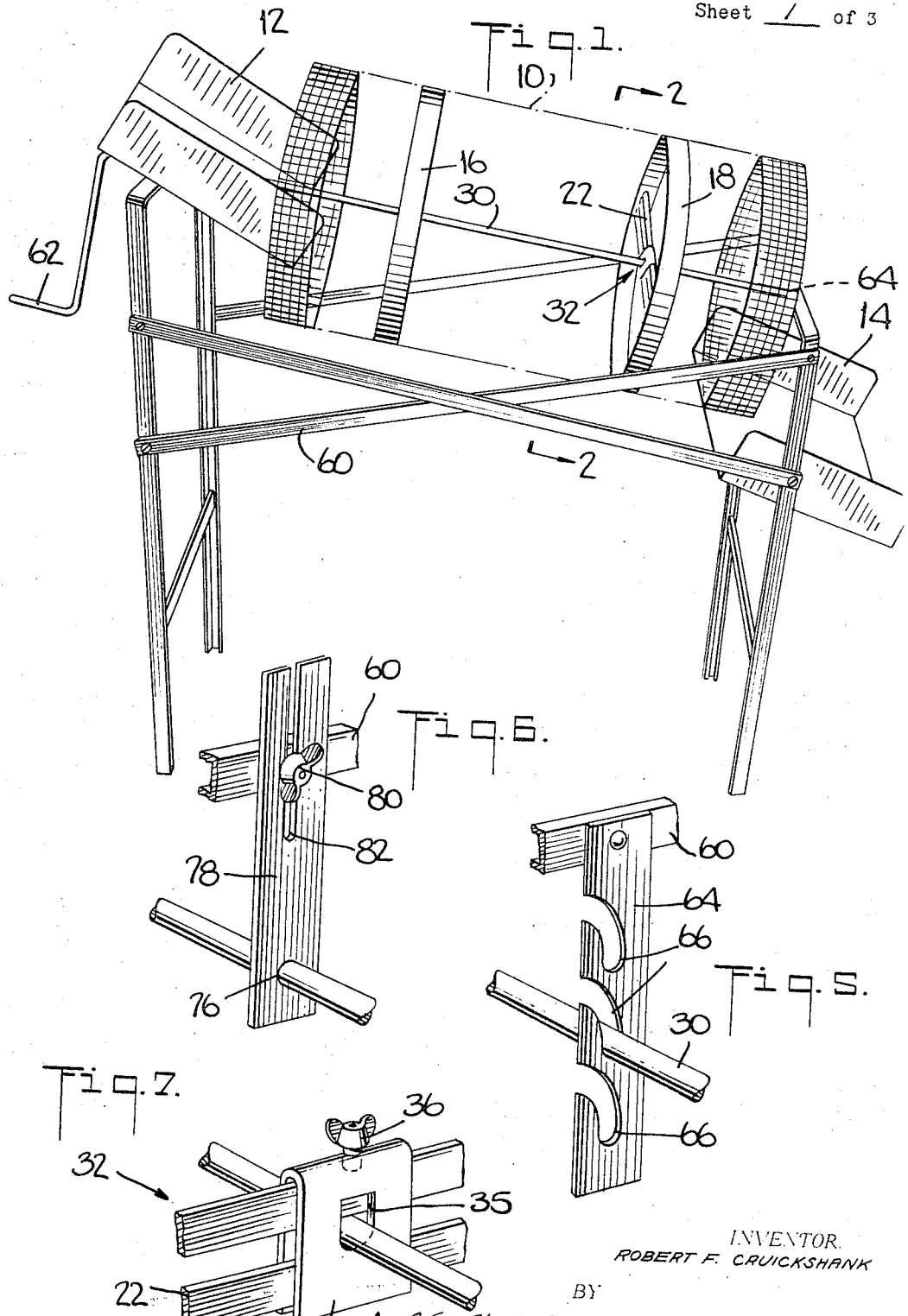

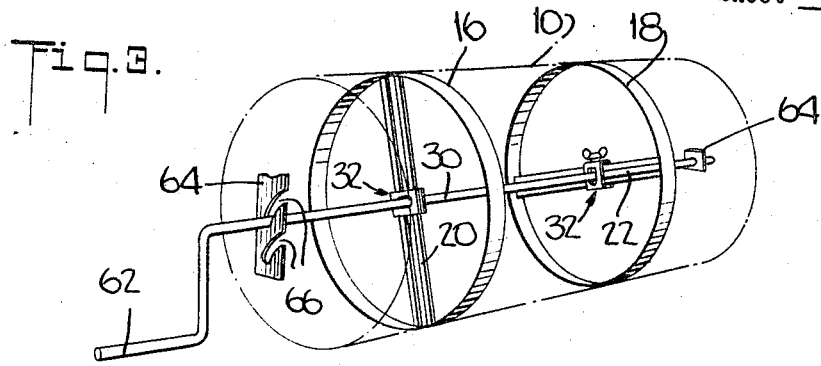
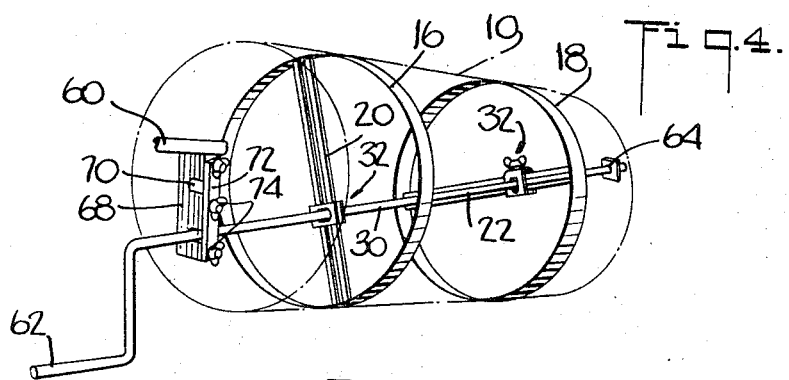
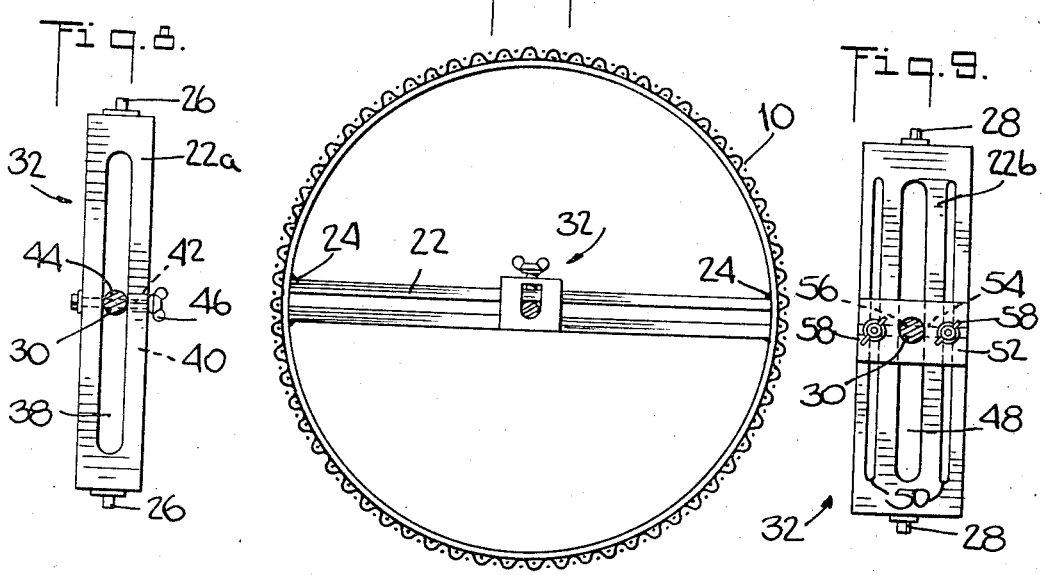

INVENTOR.
ROBERT F. CRUICKSHANK
BY
Ward, Haselton, McElhannon, Orme, Brooks & Fitzpatrick
ATTORNE United States Patent Office 3,426,898
Patented Feb. 11, 1969

3,426,898
SOIL SIFTER
Robert F. Cruickshank, Scarsdale, N.Y., assignor to Nip-Co Manufacturing, Inc., New Rochelle, N.Y., a corporation of New York
Filed Oct. 10, 1966, Ser. No. 585,434
U.S. Cl. 209—245
Int. Cl. B07b 1/24
23 Claims

ABSTRACT OF THE DISCLOSURE

A sifter having a revolvable mesh cylinder with an inlet at one end and an outlet at the other. A pair of diametric supports mounted on the cylinder, and a rotatable rod adjustably mounted at a multiplicity of positions on said supports, the rod also being adjustable mounted on a cradle.

This invention is concerned with the problem of sifting, screening, segregating, processing, improving, compounding, and aerating earth, mulch, sand, stones and the like.

Heretofore, small quantities of such materials were laboriously separated and processed by the use of screens which were placed at an angle upon the ground, on rocks, or in frames, and were often vibrated by hand. Also heretofore, large processing equipment was employed which in fact had been designed for singular, specific processing of materials of far greater bulk than the quantity involved herein. Hence, it is an important object of this invention to avoid the inefficient and laborious consequences of the conventional hand modes of processing as well as to avoid the uneconomical expense of the employment of large processing equipment.

Briefly stated, the invention is concerned with a new and improved sifter of the class described which includes a revolvable mesh cylinder having a receiving inlet for the admission of flowable unprocessed material disposed at one end thereof and a dispensing outlet for the direction and rejection of stones and other deleterious material disposed at the other end thereof. A pair of spaced diametric supports are provided which are mounted on the internal surface of the cylinder and means are provided for mounting the ends of the supports so that the supports are diametrically positionable within said cylinder, respectively. A rod is employed which extends longitudinally through the cylinder and the supports are adjustably mounted on said cradle for rotation.

A feature of this invention resides in the provision of a new and improved sifter which is versatile and which is capable of performing a multitude of processing operations including admixing fertilizers, mulch, compost, pesticides and other soil additives.

Another feature of this invention is the provision of a sifter which can readily receive an average size garden wheelbarrow thereunder for receiving processed material. Moreover, the sifter is capable of being driven by hand or by motor.

According to the present invention, as another feature thereof, there is provided a new and improved sifter which permits various settings along the diametric supports, and which permits various settings of the rod and cradle. This can permit double processing of difficult materials because the sifter may be adjusted so that one end of the cylinder passes the material toward the center, while the other end of the cylinder, being adjusted 90 degrees behind or out of phase, for example, travels in the opposite direction of the falling material. This action provides three (3) distinct benefits. Firstly, the effective sifting or efficiency of operation is approximately double. Secondly, the still unprocessed material is returned from the second end of the cylinder toward the center for additional or repeated processing, and thirdly, by distributing the various stages of processing along the length of the cylinder, torque at the driven end is likewise distributed thereby reducing fatigue when the machine is operated by hand or reducing the size of the driving machine required when mechanical electrical motivation is employed.

In addition, a feature of this invention resides in the provision of a device of this character of simple practical construction, which is relatively inexpensive to manufacture, and which is otherwise well suited for its intended purpose.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as the basis for the designing of other structures for carrying out the several purposes of the invention. It is important, therefore, that the claims be regarded as including such equivalent constructions as do not depart from the spirit and scope of the invention.

Several embodiments of the invention have been chosen for purposes of illustration and description, and are shown in the accompanying drawings, forming a part of the specification, wherein:

FIG. 1 is a perspective view of a sifter constructed in accordance with the concepts of this invention;

FIG. 2 is an enlarged transverse sectional view taken substantially along the line 2—2 of FIG. 1;

FIG. 3 is a fragmentary perspective view showing the rod, diametric supports, and the mounting means for mounting the rod on the cradle;

FIG. 4 is a fragmentary perspective view similar to FIG. 3, but showing the interrelationship of the rod, diametric supports, and mounting means for the rod on said cradle when said elements are disposed in different preselected relationships;

FIG. 5 is an enlarged fragmentary perspective view of the mounting means of the rod and cradle;

FIG. 6 is an enlarged fragmentary perspective view of another embodiment of mounting means for mounting the rod in the cradle;

FIG. 7 is an enlarged fragmentary perspective view of one means for adjustably mounting the rod on the diametric supports;

FIG. 8 is an enlarged side elevation of another means for adjustably mounting the rod on the diametric supports;

FIG. 9 is an enlarged side elevation of still another means for adjustably mounting the rod on the diametric supports;

Figure 10:
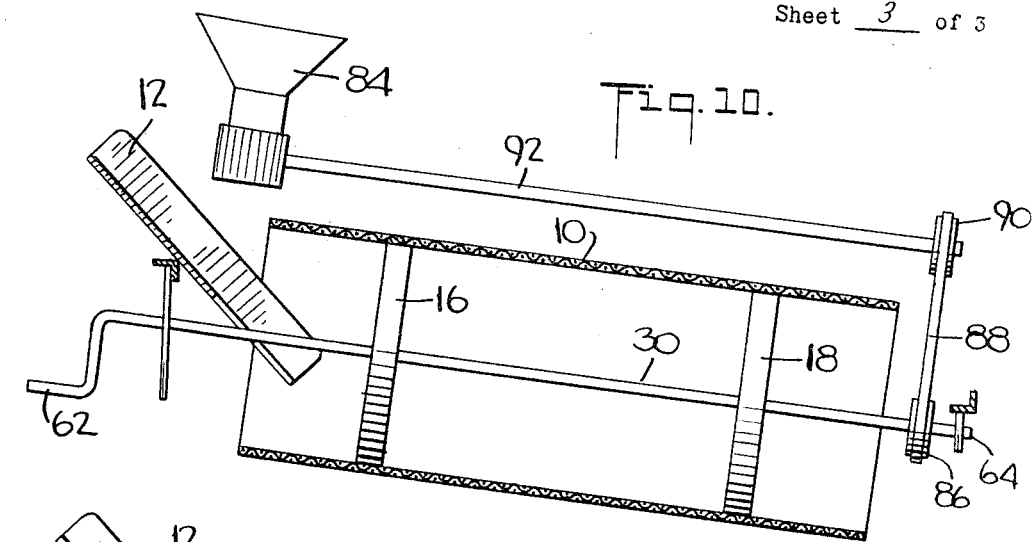
FIG. 10 is a side elevation, partly in section, of one form of the invention including the provision of a proportioning device mounted above the receiving inlet of the sifting device.

In the embodiment of the invention illustrated in FIGS. 1–4, the sifter includes a revolvable mesh cylinder 10 having a receiving inlet or chute 12 at the driving end thereof for the admission of flowable unprocessed material and a dispensing outlet or chute 14 disposed at the other end thereof for the rejection of stones and other deleterious materials. The processed material passes downwardly through the mesh cylinder 10 into a receiving container such as a wheelbarrow (not shown), for example.

As best seen in FIGS. 3 and 4, a pair of spaced hoops 16 and 18 are mounted on the inside of the cylinder and a pair of diametric supports 20 and 22 are mounted in said hoops, respectively. In the embodiment of the invention shown in FIG. 2, the support 22 is welded to the inside of the cylinder 10, as at 24. However, in the embodiments of FIGS. 8 and 9, the diametric supports 22a and 22b, respectively, are provided with bearing pins 26 and 28, respectively, for the purpose of rotatably mounting them in the cylinder 10.

A rod 30 is employed which extends longitudinally through the cylinder, and mounting means indicated generally at 32 are provided for adjustably mounting the supports on the rod as shown in FIGS. 1, 3 and 4. According to the invention, the mounting means 32 may be in a number of different forms, one form being shown in each of FIGS. 7, 8 and 9 inclusive as will be described more fully hereinafter.

Referring to FIG. 7, the mounting means 32 comprises a U-shaped clamp member 34 having an opening 36 therethrough for receiving the rod 30. The clamp member is longitudinally positionable on the support member 22 for adjusting purposes as will be explained more fully hereinafter. A thumb screw 36 serves to releasably secure the clamp in a preselected longitudinal position on the support.

Referring next to the embodiment of FIG. 8, there is illustrated a support member 22a which has a first longitudinal slot 38 extending therethrough for receiving rod 30. The support also has a second longitudinal slot 40 spaced at an angle of substantially 90 degrees with respect to the first slot. A locating pin 42 extends through said second slot and also passes through a hole 44 in the rod 30 provided for the purpose. The rod is secured in its preselected position by means of the wing nut 46 bearing against the side of the support member adjacent slot 40. It will be appreciated that the diametric support member 20 is constructed and operates identically to the diametric support member 22. However, a round hole 44 is provided in the rod 30 adjacent one of the supports and a slot may be provided in the rod adjacent the other support member for purposes of allowing a difference in the spacing between the two supports depending upon the selected position of adjustment of the rod in the supports.

As best seen in FIG. 9, another embodiment of the support member is shown wherein the support 22b is provided with a major longitudinally extending slot 48 for receiving the rod 30, and a pair of parallel minor longitudinally extending slots 50. A clamp assembly 52 extends perpendicularly to the slots and is positionable longitudinally thereof. Locating pin 54 extends through clamp assembly 52 and also passes through a hole 56 in the rod 30 provided for the purpose. A hole 56 is provided in the rod 30 adjacent one of the supports and a slot may be provided in the rod adjacent the other support member for purposes of allowing a space differential between the two supports according to the selected position of the rod in the supports. The clamp assembly 52, together with the rod 30, are held in their preselected position by means of a bolt and wing nut assembly 58.

It will be appreciated that the adjustable clamps of FIGS. 7, 8 and 9 permit an infinite number of settings of the rod along the length of the slot in the diametric supports, thereby providing duel eccentric operation. In operation, an axial or central positioning of the rod and clamps on the diametric supports will describe a perfectly circular rotation of the cylinder, as is shown in FIG. 3, whereas positioning the rod and clamp an equal distance in the same direction along both diametric supports will produce a single elliptical orbit of the cylinder along its entire length, and positioning the rod and clamp unequal distances in the same direction, or positioning the clamp equal or unequal distances in the opposite direction along either support will cause the cylinder to describe dissimilar and constantly changing orbits along its length. If the diametric supports have equal settings which are 90 degrees out of phase one from the other, it will cause the front end of the system to describe an elliptical orbit that is 90 degrees behind the other end. Accordingly, it is evident that varying settings along the diametric support permits various degrees of processing up to multi-processing. That is, if the first side of the cylinder tosses the material toward the center and the second side thereof is 90 degrees behind in phase, it would be travelling in the opposite direction of the falling material and would toss the material in the opposite direction, thereby processing the material twice.

Reverting back to FIG. 1, the entire mesh cylinder and rod assembly is supported by a frame or cradle 60. Motive means such as hand crank 62 serves to drive the rod 30, but an electric motor or gas engine may be used for the purpose, if desired.

In order to prevent the material from spilling out of the first end of the cylinder during processing and to prevent the material from spilling out of the second end of the cylinder before being completely processed, means are provided for obtaining a readily adjustable pitch along the entire length of the cylinder. Preferably, the adjusting means are located adjacent the first or handle end of the machine, and as seen in FIGS. 3 and 4, the second or other end of the machine is provided with a fixed bearing support 64 for mounting the rod 30. FIGS. 4, 5 and 6 show three ways of adjustably mounting the first end of the rod 30. Referring first to FIG. 5, a tab 64 slot 82, as shown. Thus, the pitch of the rod 30 may of spaced tear-drop shaped cut outs 66, any one of which may receive rod 30, as desired. As seen in the embodiment of FIG. 4, a tab 68 depends from the cradle 60 and is provided with substantially horizontal cut outs 70, any one of which may be selected for receiving the rod 30, as desired. In this embodiment a cleat 72 is positioned over the cut outs after the rod has been placed in its preselected position and is secured to the tab by means of thumb screws 74. Referring to FIG. 6, the rod 30 passes through hole 76 in tab 78, and the tab is adjustably secured to the cradle 60 by means of a wing nut and screw 80 which are adjustably securable in slot 82, as shown. Thus, the pitch of the rod 30 may be positionable, as desired or as determined by the characteristics of the material being processed.

As seen in FIG. 10, the system may further include a proportioning device 84 mounted above the cylinder inlet 12. This device may be of any suitable construction such as a rotating gear type dispenser, for example. It is driven by the rotatable rod 30 through a pulley 86, belt 88, pulley 90 and drive shaft 92. This system effects a proportionate admixing of dry pesticides, fertilizers or other additives to the material being processed.

Figure 11:
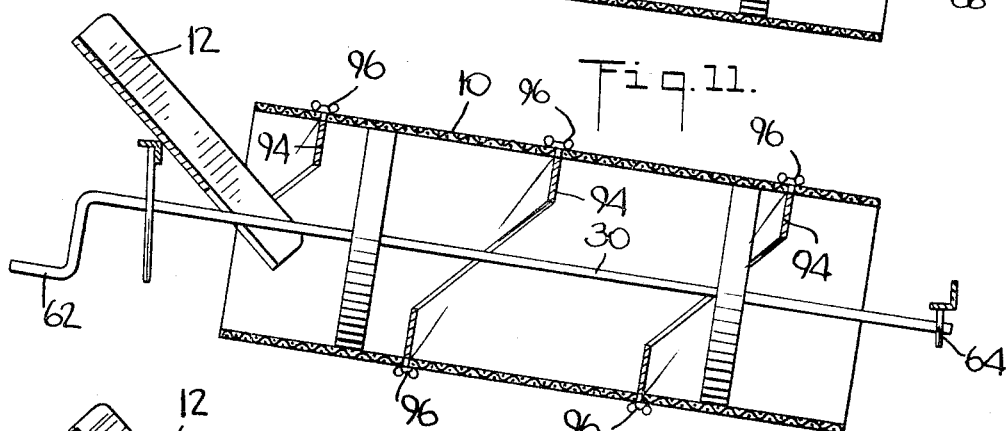
FIG. 11 is a side elevation, partly in section, showing another form of the invention including inwardly internally projecting blades in the cylinder.

Referring to FIG. 11, there is shown a plurality of spaced inwardly projecting blades 94 along the entire circumference and length of the cylinder, external lugs 96 being provided for purposes of adjusting the blades. The nature of the material being processed determines the pitch of the rod and cylinder which, in turn, dictates the positioning of the adjustable blades because the angle of the material being processed varies in accordance with the composition, degree of eccentricity, pitch of the rod and cylinder and various combinations thereof.

The blades may be affixed in such a manner that their broader dimensions or flat faces are roughly perpendicular to the direction of flow of the material being processed, when the cylinder is being rotated in a first direction. Rotation of the cylinder in the opposite direction serves to empty the cylinder of undesirable waste at the termination of a given process period.

Figure 12:
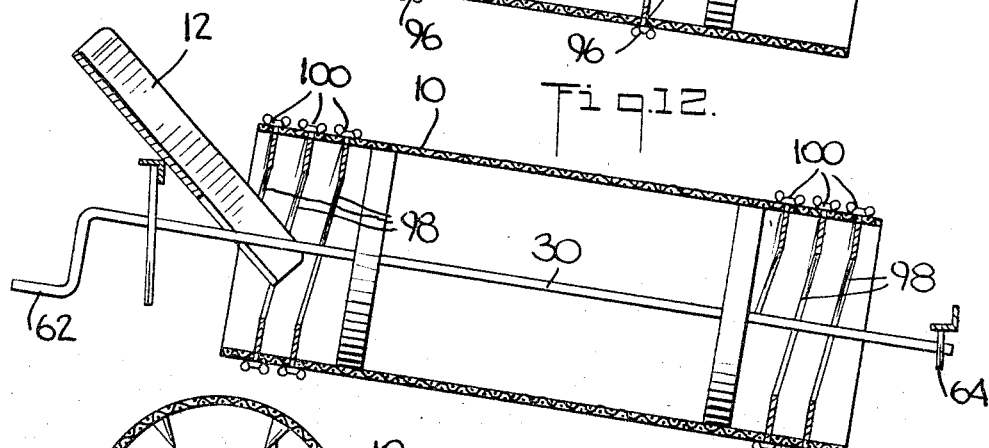
FIG. 12 is a side elevation, partly in section, of the device similar to FIG. 11 but showing a different configuration of internally projecting blades.

In FIG. 12 the blades 98 project inwardly of the cylinder 12 and are disposed towards the ends of the cylinder in order to direct the material towards the center thereof for repeated processing. These blades are movable or adjustable by means of external lugs 100 provided for the purpose.

Processing can be accomplished with the rod and cylinder in their horizontal positions, and at the conclusion thereof the rod and cylinder may be raised to their maximum pitch, blades positioned towards the outlet may be removed, and the undersirable residue dumped into the outgoing chute.

Figure 13:
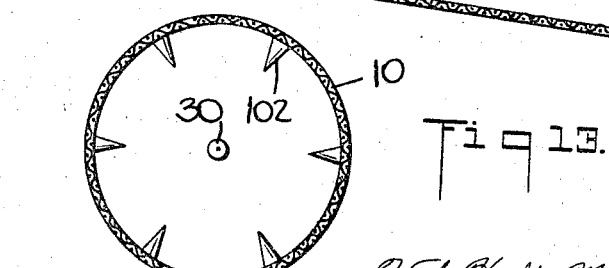
FIG. 13 is a transverse section of the mesh cylinder showing still another form of the invention employing a plurality of internally projecting shredding lugs.

Another form of this invention is shown in FIG. 13 wherein inwardly projecting cone shaped shredding lugs 102 are circumferentially disposed about the interior of the cylinder for purposes of preventing binding and for breaking up and shredding material which would otherwise be difficult to process.

Although certain particular embodiments of the invention are herein disclosed for purposes of explantion, further modifications thereof, after study of this specification, will be apparent to those skilled in the art to which the invention pertains. References accordingly should be had to the appended claims in determining the scope of the invention.

What is claimed and desired to be secured by Letters Patent is:

1. A sifter of the class described comprising a revolvable mesh cylinder having a receiving inlet towards one end and a dispensing outlet towards the other end thereof, a pair of spaced diametric supports, means mounting the ends of the said supports on the interior surface of said cylinder, a rod extending longitudinally through said cylinder, means to adjustably mount said rod on said supports at a multiplicity of positions along said supports, a cradle, mounting means for adjustably mounting said rod on said cradle, and means for rotating said rod.

2. A sifter according to claim 1 wherein said supports are diametrically positionable within said cylinder respectively.

3. A sifter according to claim 1 wherein the longitudinal axes of said supports are disposed 90 degrees out of phase one with respect to the other.

4. A sifter according to claim 1 wherein said receiving inlet is a chute on said cradle adjacent one end of said cylinder and wherein said dispensing outlet is a chute mounted on said cradle adjacent the other end of said cylinder.

5. A sifter according to claim 1 wherein said means for mounting the ends of said supports on said cylinder comprise a hoop mounted on the inside of said cylinder for each of said supports, and said ends of said supports being rotatably mounted in said hoops and said supports being diametrically positionable within said hoops respectively.

6. A sifter according to claim 1 wherein said pair of supports each have a major longitudinally extending slot for receiving said rod and a pair of minor longitudinally slots, said means adjustable mounting said rod on said supports comprises a clamp assembly extending perpendicularly to said slots and being positionable longitudinally of said support, said clamp assembly having a pin which extends through said clamp assembly and through said rod, said clamp assembly having an opening through which said rod passes, said clamp assembly having a throughbore extending substantially perpendicular to said slots, said rod having a slot disposed adjacent said throughbore, a pin extendable through said throughbore and through said rod slot, said clamp assembly having a pair of openings extending perpendicular to said minor slots, screw means extending through said last named openings and said minor slots for releasably securing said clamp assembly and rod in a preselected longitudinal position with respect to said supports.

7. A sifter according to claim 1 wherein said mounting means for adjustably mounting said rod on said cradle comprises a tab extending vertically from said cradle adjacent said rod, said tab having a plurality of longitudinally spaced cut outs extending inwardly from the side of said tab, said rod being rotatably positionable in a preselected one of said cut outs, a cleat, said cleat being removably positionable against said side of said tab by screw means, thereby releasably retaining said rod in its preselected cut out.

8. A sifter according to claim 1 wherein said mounting means for adjustably mounting said rod on said cradle comprises a tab extending vertically from said cradle adjacent said rod, said tab having an opening for rotatably receiving said rod, said tab having a vertically extending slot, screw means for securing said tab to said cradle at a preselected vertical position in said slot.

9. A sifter according to claim 1, wherein said mounting means for adjustably mounting said rod on said cradle comprises means for raising the end of said cylinder at its inlet end with respect to its outlet end.

10. A sifter according to claim 1 wherein said mounting means for adjustably mounting said rod on said cradle comprises a tab extending vertically from said cradle adjacent said rod, said tab having a plurality of longitudinally spaced horizontally and downwardly directed cut outs extending inwardly from the side of said tab, said rods being rotatably positionable in a preselected one of said cut outs.

11. A sifter according to claim 1 further comprising a plurality of spaced internally projecting shredding lugs.

12. A sifter according to claim 1 wherein said pair of supports each have a first longitudinal slot extending therethrough and a second longitudinal slot therethrough, said slots being angularly spaced one with respect to the other, and wherein said rod extends through the first slot of each of said supports, said means adjustably mounting said rod on said supports comprises a locking pin extending through each of said second slots and through said rod and fastening means for releasably securing said pins in preselected longitudinal positions in said second slots respectively.

13. A sifter according to claim 12 wherein said second slots are disposed at substantially 90 degrees with respect to the first slots, respectively.

14. A sifter according to claim 1 further comprising a plurality of spaced internally projecting blades in said cylinder.

15. A sifter according to claim 14 wherein said blades are fixedly disposed with their flat faces substantially perpendicular to the direction of flow of the material passing through the cylinder.

16. A sifter according to claim 14 wherein said blades are spaced towards the ends of said cylinder.

17. A sifter according to claim 14 wherein said blades are spaced along the entire length of said cylinder.

18. A sifter according to claim 1 further comprising a proportioning device mounted above said receiving inlet.

19. A sifter according to claim 18 further comprising means drivingly connecting said proportioning device and said rod.

20. A sifter of the class described comprising a revolvable mesh cylinder having a receiving inlet towards one end and a dispensing outlet towards the other end thereof, a pair of spaced diametric supports, a hoop mounted on the inside of said cylinder for each of said supports, the ends of said supports being fixedly mounted on said hoops, a rod extending longitudinally through said cylinder, means to adjustably mount said rod on said supports at a multiplicity of positions along said supports, a cradle, mounting means for adjustably mounting said rod on said cradle, and means for rotating said rod.

21. A sifter of the class described comprising a revolvable mesh cylinder having a receiving inlet towards one end and a dispensing outlet towards the other end thereof, a pair of spaced diametric supports, means mounting the ends of said supports on the interior surface of said cylinder, a rod extending longitudinally through said cylinder, each of said supports having a longitudinally extending slot for receiving said rod, a U-shaped clamp having an opening therethrough for receiving said rod, said clamp being longitudinally positionable on said support, screw means for releasably securing said clamp in a selected longitudinal position on said support, a cradle, mounting means for adjustably mounting said rod on said cradle, and means for rotating said rod.

22. A sifter of the class described comprising a revolvable mesh cylinder having a receiving inlet towards one end and a dispensing outlet towards the other end, thereof, a pair of spaced diametric supports, means mounting said supports on said cylinder, longitudinally extending rod means, means to adjustably mount said rod means on said supports at a multiplicity of positions along said supports, a cradle, mounting means for adjustably mounting said rod means on said cradle, and means for rotating said rod means.

23. A sifter according to claim 22 wherein the longitudinal axis of said supports are adjustably positionable at a multiplicity of angles out of phase one with respect to the other.

References Cited

UNITED STATES PATENTS

| | | | |
|---|---|---|---|
| 88,913 | 4/1869 | Seibert | 209—410 X |
| 231,992 | 9/1880 | Thomas et al. | 209—245 X |
| 237,162 | 2/1881 | Brown | 209—246 |
| 261,653 | 7/1882 | Bayley | 209—410 X |
| 343,761 | 6/1886 | Dougan | 209—413 X |
| 351,207 | 10/1886 | Scott | 209—410 X |
| 529,947 | 11/1894 | Pearsons | 209—409 X |
| 848,270 | 3/1907 | Stanton | 209—297 |
| 1,677,862 | 7/1928 | Herrold | 209—288 |
| 2,721,035 | 10/1955 | Lankford et al. | 209—284 X |
| 2,985,302 | 5/1961 | Brands | 209—288 X |

FOREIGN PATENTS 315,161  10/1919  Germany.

HARRY B. THORNTON, *Primary Examiner.*

T. R. MILES, *Assistant Examiner.*

U.S. Cl. X.R.

209—284, 297, 410, 413

UNITED STATES PATENT OFFICE
CERTIFICATE OF CORRECTION

Patent No. 3,426,898 February 11, 1969

Robert F. Cruickshank

It is certified that error appears in the above identified patent and that said Letters Patent are hereby corrected as shown below:

Column 1, line 37, "large" should read -- larger --. Column 4, line 39, cancel "slot 82, as shown. Thus, the pitch of the rod 30 may" and insert -- depends from the cradle 60 and is provided with a series --. Column 5, line 15, "undersirable" should read -- undesirable --; line 24, "explantion" should read -- explanation --.

Signed and sealed this 17th day of March 1970.

(SEAL)
Attest:

Edward M. Fletcher, Jr.
Attesting Officer

WILLIAM E. SCHUYLER, JR.
Commissioner of Patents